US 6,742,340 B2

(12) United States Patent
Nearhoof, Sr. et al.

(10) Patent No.: US 6,742,340 B2
(45) Date of Patent: Jun. 1, 2004

(54) FUEL INJECTION CONTROL SYSTEM FOR A TURBINE ENGINE

(75) Inventors: Charles F. Nearhoof, Sr., Osceola Mills, PA (US); Charles F. Nearhoof, Jr., Osceola Mills, PA (US); Kevin P. Pearce, Johnstown, PA (US)

(73) Assignee: Affordable Turbine Power Company, Inc., Osceola Mills, PA (US)

( * ) Notice: Subject to any disclaimer, the term of this patent is extended or adjusted under 35 U.S.C. 154(b) by 0 days.

(21) Appl. No.: 10/059,501

(22) Filed: Jan. 29, 2002

(65) Prior Publication Data

US 2003/0140614 A1 Jul. 31, 2003

(51) Int. Cl.$^7$ .................................................. F02C 9/00
(52) U.S. Cl. .................. 60/773; 60/776; 60/39.281; 60/39.76; 60/39.81
(58) Field of Search ................ 60/773, 776, 39.281, 60/39.76, 39.81

(56) References Cited

U.S. PATENT DOCUMENTS

| | | | | |
|---|---|---|---|---|
| 3,644,815 A | * | 2/1972 | Falk | 318/609 |
| 3,688,495 A | * | 9/1972 | Fehler et al. | 60/39.281 |
| 3,738,104 A | * | 6/1973 | Rosa | 60/39.281 |
| 4,454,713 A | * | 6/1984 | Meyer et al. | 60/39.281 |
| 4,464,895 A | * | 8/1984 | Morrison et al. | 60/790 |
| 4,545,198 A | * | 10/1985 | Yoshida | 60/39.25 |
| 4,815,278 A | * | 3/1989 | White | 60/39.281 |
| 4,926,629 A | * | 5/1990 | Eick et al. | 60/39.281 |
| 5,349,811 A | * | 9/1994 | Stickler et al. | 60/776 |
| 5,603,211 A | | 2/1997 | Graves | |
| 5,966,937 A | | 10/1999 | Graves | |
| 6,240,340 B1 | | 5/2001 | Minowa et al. | |
| 6,260,547 B1 | | 7/2001 | Spencer-Smith | |
| 6,279,841 B1 | | 8/2001 | McCormick | |

\* cited by examiner

Primary Examiner—Charles G. Freay
Assistant Examiner—William H. Rodriguez
(74) Attorney, Agent, or Firm—Kevin J. Garber

(57) ABSTRACT

This invention is a fuel injection control system for a turbine engine. The invention uses at least one fuel injector, having means for injecting fuel in pulses to the combustion chamber of a turbine engine, and an electronic control unit to receive and interpret input sensor signals from selected operating functions of the engine and to generate and direct fuel injection signals to modify the pulse duration and/or frequency of fuel injection in response to a deviation from a selected operating function, such as the desired operating speed, caused by variable operating loads encountered by the turbine engine. This configuration provides significantly greater fuel efficiency, better operational control and response time, and a lighter weight than is currently available in turbine engines. The invention may be used in many applications such as commercial, private, experimental and military aviation, power plant turbines, and other industrial, military and mining applications.

19 Claims, 7 Drawing Sheets

Fuel Injection Control System for a Turbine Engine, Nearhoof (Inventor), App. No. 10/059,501

FUEL INJECTION CONTROL SYSTEM FOR A TURBINE ENGINE

TECHNICAL FIELD

This invention relates to a fuel injection control system for turbine engines that can be used in many different applications such as jet and turboprop engines used in commercial, private, experimental and military aviation, power plant turbines, and other industrial and mining applications for turbine engines. Injectors inject fuel into the combustion chamber of a turbine engine. An electronic control unit, pulse width modulation system governs the injection duration and/or frequency of the pulsed fuel, providing precise operational control over a very broad range of operating conditions. The control system thus provides significantly better fuel efficiency, lighter weight, and better engine operational control than is currently available in turbine engines.

BACKGROUND OF THE INVENTION

Conventional turbine engines used in most applications, including aviation, power generation, and industrial applications, generally have a combustion chamber, in which fuel is combusted in the presence of air to produce exhaust gas which drives a series of gears/shafts and ultimately the driven load (such as a propeller, fan or blades of the turbine engine, a pump, a generator, or a speed conversion unit) depending upon the application, and a continuous-stream fuel delivery system (such as a valve or nozzle), which delivers fuel to the combustion chamber for combustion. These fuel delivery systems generally introduce fuel in a continuous stream into the combustion chamber, and are usually controlled by mechanical means that sense and respond to changing pressure, vacuum, or other physical or mechanical inputs within the system.

Conventional fuel delivery systems for turbine engines also rely on any of several physical processes to break the continuous fuel stream into fuel droplets or a mist for combustion to take advantage of the well-known inverse relationship between the size of a fuel droplet and the efficiency of combustion. The smaller the fuel particle, the greater the rate and efficiency of combustion. Engineers and scientists have experimented with fuel nozzle design for many years to maximize the efficiency of combustion. Examples include U.S. Pat. No. 5,603,211 ("Outer Shear Layer Swirl Mixer for a Combustor") and U.S. Pat. No. 5,966,937 ("Radial Inlet Swirler with Twisted Vanes for Fuel Injector"). Typical "break-up" processes include the use of physical barriers against which fuel is directed to spatter it into droplets; the use of "swirlers," "slingers" or other centrifugal force generators which sling fuel against the wall of a combustion chamber to break up a continuous fuel stream using mechanical means; and the use of high velocity air streams to fractionate a continuous fuel stream. Thus, the object of the modern design of turbine fuel delivery systems is to employ a process to break up a continuous stream of fuel droplets or to atomize the fuel. An object of this invention is to supplement the mechanical breakup of fuel by pulsing the fuel stream into the combustion chamber.

Turbine engines as described above suffer from several significant limitations that relate to continuous-stream, mechanical-control delivery systems. These limitations include at least the following: (1) fuel combustion is less efficient than it would be if fuel would be introduced into the combustion chamber in droplets rather than via a continuous stream; (2) there may be inefficient fuel distribution throughout the combustion chamber, which contributes to the inefficiency of combustion; (3) the exhaust gas often contains unburned fuel, which may contribute to air pollution; (4) the control systems often do not permit the operator control the fuel delivery process in relation to important operating variables (such as flow rate, air consumption rate, load changes, etc) as precisely as may be desired; (5) the systems can be difficult to operate and maintain; (6) the control system can be complex because of many moving parts; (7) the systems can add unwanted weight to the turbine, which is particularly problematic in aviation applications; and (8) the delivery and control systems can be expensive to manufacture and/or assemble because of their complexity and close mechanical tolerances; and (9) the response time is inherently slow because it is a mechanical system.

This invention is designed to overcome these limitations through two principal features. First, fuel is injected into the combustion chamber in pulses, using a fuel injector, rather than in a continuous-stream delivery system. This feature offers the distinct advantage of atomizing the fuel and delivering it in pulses into the combustion chamber in a fine mist or even a vapor, and thereby eliminates the need to employ a physical process to break up a continuous fuel stream. The fuel is combusted more efficiently because the invention reduces the size of the individual fuel cells that are being burned. Fuel injectors are commonly used for this purpose in internal combustion engines (see, e.g., U.S. Pat. No. 6,279,841 ("Fuel Injection Valve") and U.S. Pat. No. 6,260,547 ("Apparatus and Method for Improving the Performance of a Motor Vehicle Internal Combustion Method")) but have not been used to inject fuel pulses in turbine engines. Second, the invention uses an electronic control unit that detects sensor signals from chosen operating functions of the engine and then modifies the duration and/or frequency of fuel pulses that are injected into the combustion chamber. This control system thus provides precise operational control over a very broad range of operating conditions.

The combination of these features in the invention yields a fuel injection control system for a turbine engine that makes the engine more efficient, lighter, easier to operate and maintain, and more responsive than is currently available. In an aviation application, obviously any reduction in the weight of the turbine engine benefits the overall performance and fuel efficiency of the craft.

SUMMARY OF THE INVENTION

This invention is an apparatus and method for controlling the injection of fuel in a turbine engine having a combustion chamber. The apparatus comprises at least one fuel injector having means for delivering fuel in pulses to said combustion chamber of said turbine engine; at least one operating sensor, said sensor having means for receiving sensor signals from a selected operating function of said turbine engine; a programmable electronic control unit for receiving and comparing the value of said sensor signals from said turbine engine to the value of a desired signal, and for generating fuel injector control signals in response thereto; and a means for directing said fuel injector control signals to said fuel injector to modify the pulse duration and/or frequency of fuel injection in response to a deviation from a selected operating function, such as the desired engine speed, caused by variable operating loads encountered by the turbine engine. The method for controlling the injection of fuel in a turbine engine having a combustion chamber and having at least one fuel injector and at least one sensor for sensing operating signals from said engine comprises the steps delivering fuel in pulses to said combustion chamber using said injector; sensing at least one operating sensor signal from said turbine engine using said sensor; directing sensor signals from said operating sensor to a programmable electronic control unit; at said programmable electronic control unit, comparing the value of said sensor signal to the value of a desired signal and generating fuel injector control signals in response to said sensor signal; and directing said fuel injector signals to said fuel injector to modify the pulse duration and/or frequency of fuel injection in response to a deviation from desired engine speeds caused by variable operating loads encountered by the turbine engine.

DETAILED DESCRIPTION OF THE INVENTION

Figure 1:
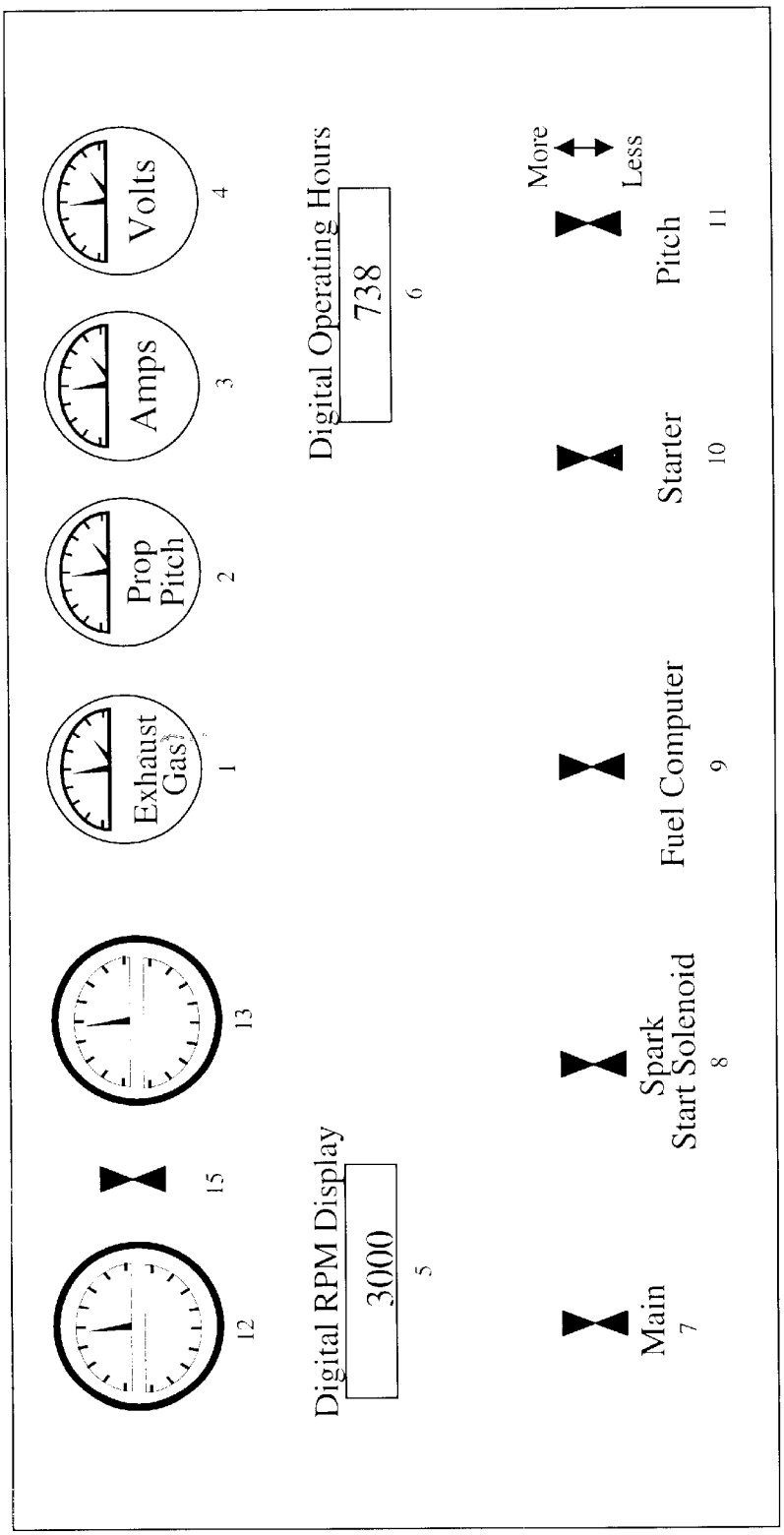
FIG. 1 is a diagram of a hypothetical, typical control panel for the turbine engine of a turbo-prop airplane
Figure 5:
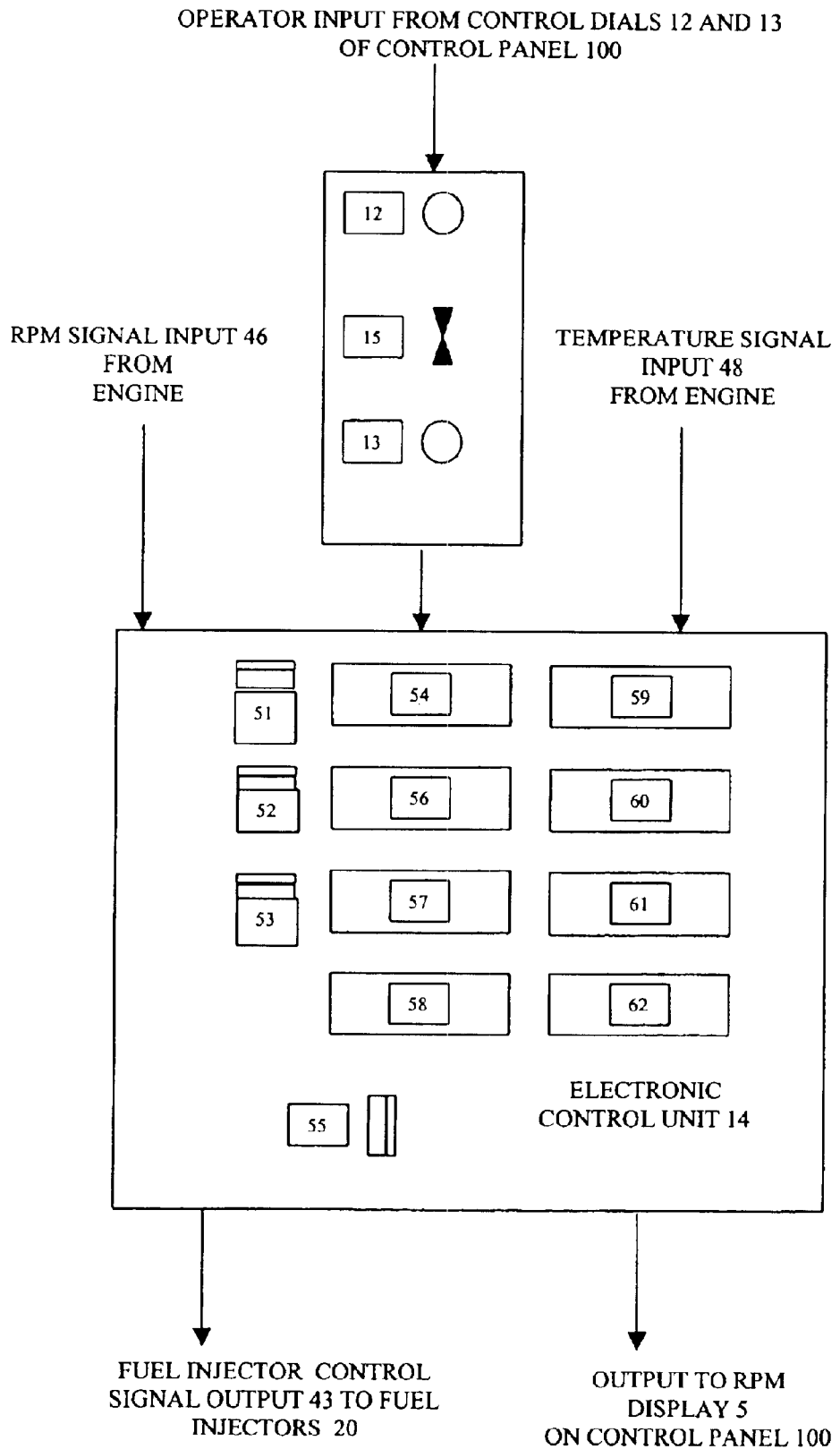
FIG. 5 is a schematic representation of a configuration of integrated circuits on the electronic control unit.
Figure 6:
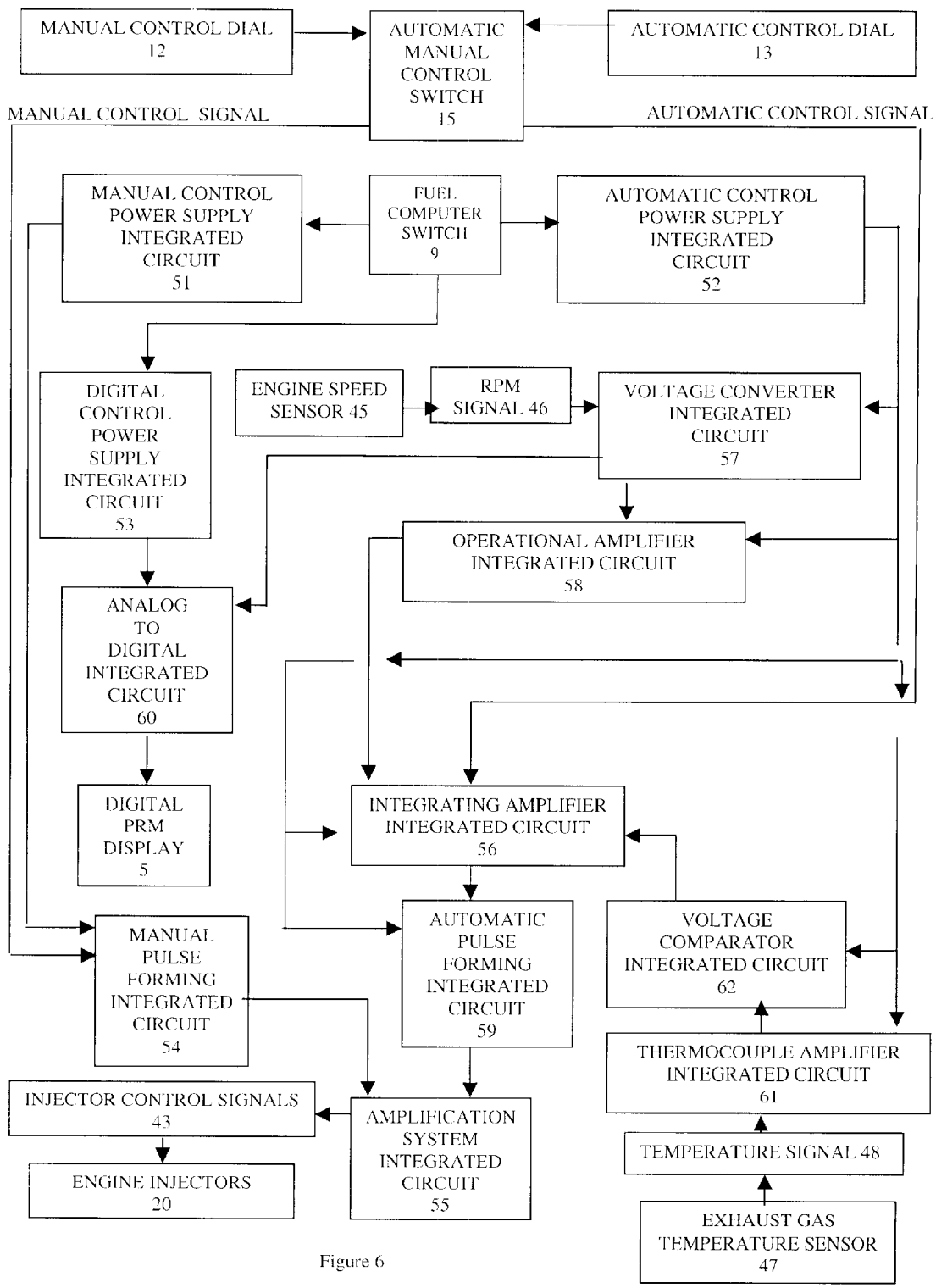
FIG. 6 is a block diagram showing the operating steps of the fuel injection control system.

Referring now to the figures, FIG. 1 is a diagram of a hypothetical but typical control panel for a turbine engine of a turboprop airplane, which is one possible application for the invention and is the embodiment described herein. However, there are many applications for the invention; this is just one of its many potential applications to turbine engines. In the embodiment illustrated here, a typical control panel 100 contains instrument gauges for exhaust gas temperature 1, propeller pitch 2, amps 3 and volts 4. The panel may also contain other gauges for other relevant parameters such as fuel level, oil pressure, air speed, altitude, etc., all of which have been omitted here. The hypothetical control panel 100 illustrated in FIG. 1 contains digital displays for engine revolutions per minute (RPM) 5 and operating hours 6. It also contains toggle switches for the main switch 7, spark start solenoid 8, fuel computer 9, starter 10, and propeller pitch 11. The panel has manual control dial 12 and automatic control dial 13 for operating the fuel injection control system, and control switch 15 for switching between manual and automatic operation. Control dials 12 and 13 are connected to electronic control unit (ECU) 14, which in this application does not sit on control panel 100. ECU 14 can be located at any desired place on the engine. ECU 14 functions as a pulse width modulation control system for the fuel injectors, as shown in FIGS. 5 and 6 and described below. The ECU may take any of several forms, including solid state circuitry, a microprocessor and a microcomputer.

Figure 2:
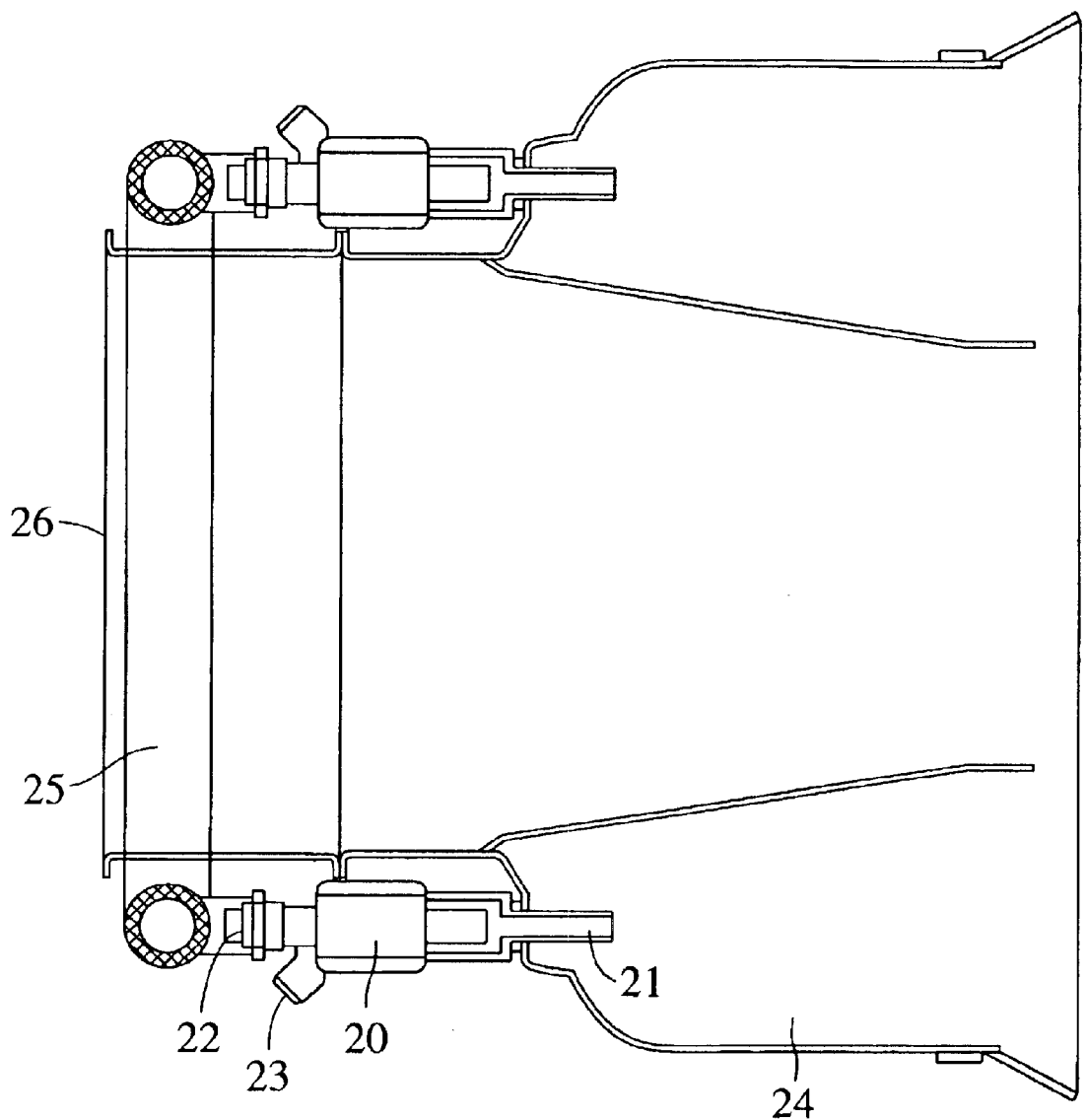
FIG. 2 is a schematic representation of a fuel injector projecting into the combustion chamber of a turbine engine and connected to the engine's control panel.

FIG. 2 is a schematic illustration of a fuel injector projecting into the combustion chamber of a turbine engine.

Figure 2A:
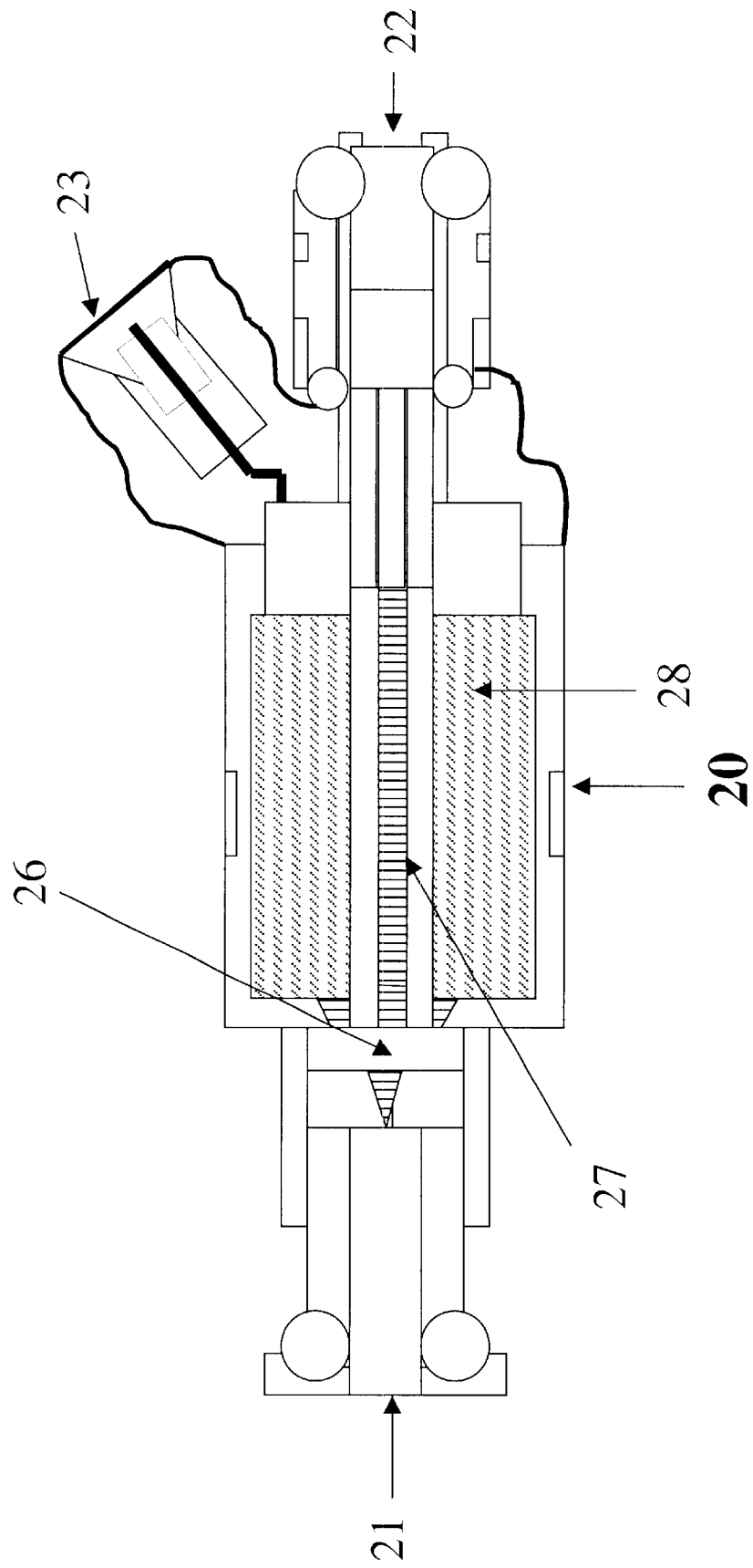
FIG. 2a is a side view of a typical fuel injector.

FIG. 2*a* is a side view of a typical fuel injector. Various types of fuel injectors are known for use in internal combustion engines such as automobile engines. They are available commercially from any of several manufacturers (e.g., Ford Motor Company, Robert Bosch GmbH) as off-the-shelf items. The novelty of this invention consists, in part, in adapting a fuel injector and employing sensors and ECUs for turbine engine use. The size and number of injectors used in any particular application will depend on the size of the engine, the size of the combustion chamber, the desired horsepower output, and similar factors. Many applications, including the aircraft embodiment described herein, will commonly employ from 4 to 8 fuel injectors. However, any turbine engine to which this invention applies will have at least one fuel injector having a means for delivering fuel in pulses into a combustion chamber. The injectors may be connected by a common fuel line (such as a fuel rail) or may have independent lines as desired. A fuel pump may be used to pump fuel into the fuel line. Conceivably, the electronic control unit could be integrated with the fuel pump as an additional or alternate way to control fuel injecting into the combustion chamber.

As shown in FIGS. 2 and 2*a*, a typical injector 20 has a fuel inlet port 22 which receives fuel from a fuel tank or other supply source, a fuel injection port 21, and a control port 23. In the embodiment illustrated in FIG. 2, fuel is distributed to fuel inlet port 22 of the fuel injector through a fuel rail 25. Preferably, each injector should be positioned so that its fuel injection port 21 protrudes into combustion chamber 24 of the turbine engine. Wiring or other appropriate means of directing injector signals from the ECU to the fuel injector (as described below) is connected with the fuel injector 20 through control port 23. This arrangement allows injector 20 to inject pulses of fuel through injector port 21, in response to fuel injector signals directed into control port 23 from ECU 14, directly into combustion chamber 24, where the fuel pulses can be burned in the presence of air in the chamber. Exhaust gases from combustion in the combustion chamber are exhausted through an exhaust cone 26 or similar structure, as depicted in FIG. 2.

It is helpful to generally describe how a fuel injector functions before describing how this invention's control system integrates with the fuel injector(s) to control fuel injection in response to a deviation from desired operating speeds caused by variable operating loads encountered by the engine. Fuel injectors commonly have an electrically controlled or electromagnetically actuated valve that regulates the flow of fuel through the injector. A valve-closure member (or plunger) 27 typically presses against a valve seat 26 in the closing direction when the magnetic coil 28 is not excited. When the coil is excited, the valve-closure member releases from the valve seat in the open direction. Thus the injector valve opens and closes at desired intervals in response to an electrical stimulus to the injector's electromagnet, thereby delivering a desired amount of fuel (usually measured in milligrams) per given period of time (usually measured in milliseconds) through the injector into the combustion chamber. The injector nozzle (not shown on the drawings) is designed to atomize the fuel or to make as fine a fuel mist as is possible so that the fuel burns easily.

A cycle of valve operation is defined as a given period of time during which the valve has both open and closed phases. The flow of fuel through an injector is generally governed by two variables, pulse width and frequency. Pulse width refers to the length of time (measured typically in milliseconds) that the valve is open during one complete cycle of valve operation. For example, a greater pulse width means that the valve is open relatively longer than it is for a shorter pulse width during a given cycle. A greater pulse width allows more fuel to pass through the injector than a shorter pulse width. Frequency refers to the spacing between valve cycles. The term "pulse width modulator" (PWM) refers to the ability to control pulse width during a given frequency.

Figure 3:
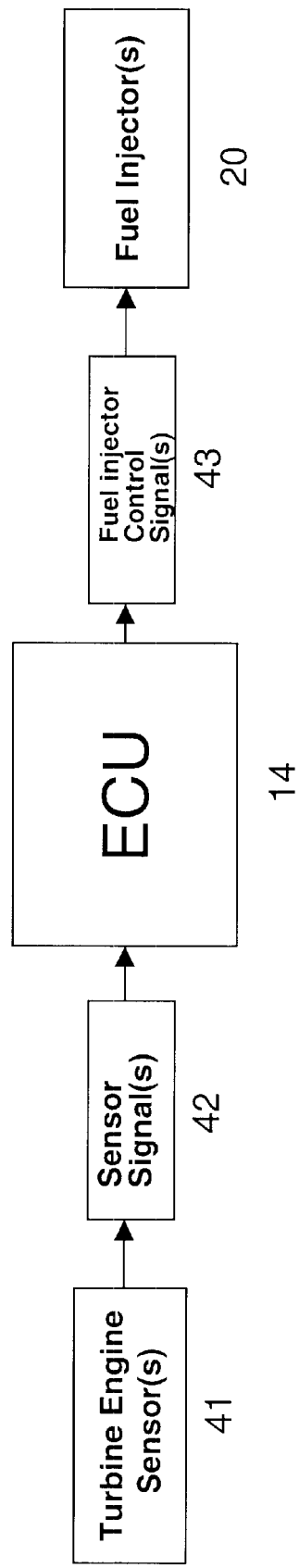
FIG. 3 is a block diagram showing the relationship among the turbine engine sensors, electronic control unit and fuel injector.
Figure 4:
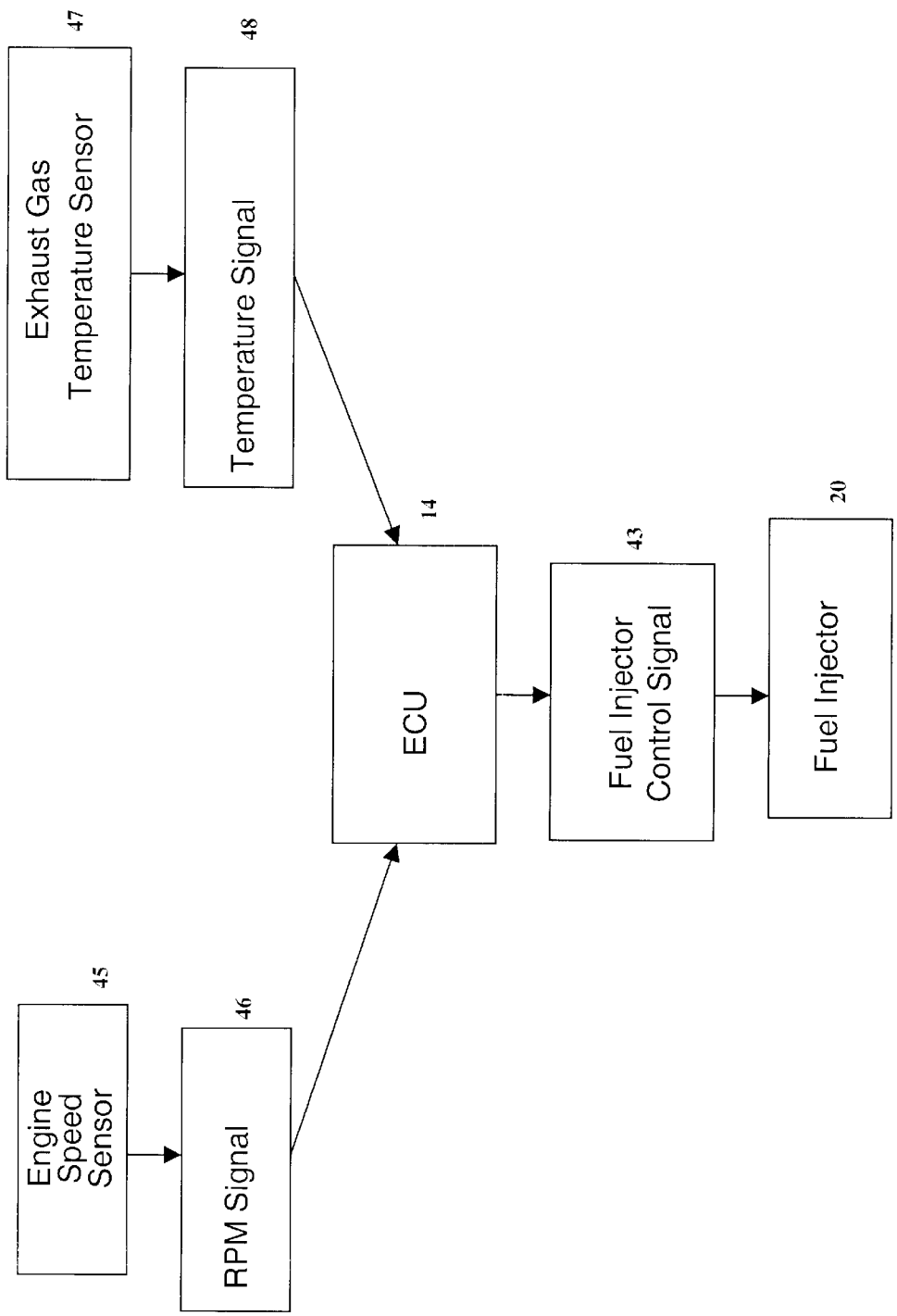
FIG. 4 is a block diagram showing the use of engine speed, measured as revolutions per minute, and exhaust gas temperature, measured using an exhaust gas temperature probe, as turbine engine sensors to generate sensor signals which are conveyed to the electronic control unit.

FIGS. 3 and 4 are simplified diagrammatic overview representations of the best mode of how the control system functions to control the duration and/or frequency of fuel pulsing into the combustion chamber. The control system comprises one or more sensors that track selected engine operating functions (such as engine speed, engine power, engine fuel demand, or other function(s)) to determine how well the engine is performing as compared to a desired condition or set point; a group of inputs into ECU 14; a programmable memory device such as one or more integrated circuits, or computer chips, which comprise ECU 14 itself; and a group of outputs from ECU 14 that control fuel injection into the combustion chamber. As illustrated in FIG. 3, turbine engine sensors 41 sense deviations in the selected operating function in response to various demands placed on the engine. The selected operating function can be either static or dynamic i.e., the operating function "set point" may stay constant or vary as the engine operates. In this embodiment, turbine engine sensors 41 sense deviations in operating speed resulting from variable operating loads (i.e., increasing the load decreases engine operating speed) and generate electric sensor signals 42, which function as the inputs to ECU 14. The outputs from ECU 14 are electric fuel injector control signals 43 that pass to control port 23 of fuel injector 20 to regulate the pulse duration and/or frequency of fuel pulsing through injector port 21 into combustion chamber 24. ECU 14 conceivably can be programmed to generate fuel injector signals 43 that modify the ratio of pulse duration to frequency of the fuel injector in response to a deviation from desired operating speeds In the embodiment illustrated here (i.e., employing the fuel injection control system to control operating speed of a turbo-prop airplane), the selected turbine engine sensor inputs 41 to ECU 14 are the revolutions per minute (RPM) of the output shaft and the temperature of the exhaust gas, as depicted in FIG. 4. A wide variety of other input signals, such as oxygen content of the exhaust gas, mass airflow into the engine, engine temperature, and driven load (including but not limited to propeller pitch, generator load, and fluid power loads) may be used as appropriate, depending on the application. As shown in FIG. 4, the turbine engine is fitted with engine speed sensor 45 and with an exhaust gas temperature sensor 47 to detect the RPMs and exhaust gas temperature, respectively, of the engine as the engine responds to differing loads it encounters. These sensors can be conventional devices for monitoring these functions, such as a tachometer and a thermocouple temperature probe. Engine speed sensor 45 generates an electric RPM signal 46 that is conveyed to ECU 14 by an appropriate means such as conventional wiring. Likewise, exhaust gas temperature sensor 47 generates an electric temperature signal 48 that is also conveyed to ECU 14 by an appropriate means. ECU 14 then generates fuel injector control signals 43 that are conveyed to fuel injector 20 to control the duration and/or frequency of fuel passing through the injector in response to variations in the input signals, as discussed below.

ECU 14 comprises a group of integrated circuits that receives input signals and generates output signals as shown in FIG. 5. ECU 14 may be programmed with integrated circuits as desired. In this embodiment, the input signals are operator inputs from control dials 12 and 13, and RPM signal 46 and temperature signal 48 from the engine. The output signals are fuel injector control signals 43 to the control ports 23 of fuel injectors 20 and an output to RPM display 5 on control panel 100. FIGS. 5 and 6 together illustrate how ECU 14 functions.

The operator first selects manual mode by switching control switch 15 to activate manual control dial 12 on control panel 100, engages starter 10, and turns on spark start solenoid switch 8 to cause the turbine to begin to rotate. The operator then turns on fuel computer switch 9 to cause the engine's battery to deliver an electric current to the selected number of system power supply integrated circuits which are located on ECU 14, as illustrated in FIG. 5. The embodiment shown here has three such power supply integrated circuits. Manual control power supply integrated circuit 51 regulates the power provided by the engine's battery to a uniform voltage and supplies it to the manual control portion of the unit. Automatic control power supply integrated circuit 52 regulates and supplies power to the automatic control portion of the unit. Digital control power supply integrated circuit 53 regulates and supplies power to digital RPM display 5 on control panel 100.

The operator next selects a desired pulse duration by rotating manual control dial 12, which transmits a signal to manual pulse forming integrated circuit 54 on ECU 14, as shown in FIGS. 5 and 6. Manual pulse forming integrated circuit 54 interprets this command signal and generates positive going pulses at a preset frequency in proportion to the supplied signal. These pulses are then directed to amplification system integrated circuit 55 on ECU 14. The pulses amplified by amplification system integrated circuit 55 become the fuel injector control signals 43 that are conveyed to engine injectors 20, which in turn open when the pulse is present and close in its absence to deliver fuel to the engine. Thus, the width (or duration) of the pulse controls the amount of fuel admitted through each injector.

The fuel entering combustion chamber 24 of the engine is ignited, and the resultant expansion of the combustion gases causes the turbine to begin to rotate at a given speed. As the operator increases manual control dial 12, an increased signal is sent to manual pulse forming integrated circuit 54, which causes an increase in the pulse width generated by manual pulse forming integrated circuit 54 and amplified by amplification system integrated circuit 55. The longer duration pulses amplified by amplification system integrated circuit 55 cause engine injectors 20 to remain open longer, thus delivering more fuel and increasing engine speed (RPM).

Upon reaching a minimum sustainable speed, the operator now switches over to automatic mode by switching control switch 15 to activate automatic control dial 13 on control panel 100. This control generates a signal that is directed to integrating amplifier integrated circuit 56 on ECU 14 (FIG. 5). The engine's electrical system alternator functions as engine speed sensor 45 by generating a frequency in proportion to its rotational speed. This frequency is directed to voltage converter integrated circuit 57, where it is converted to a DC voltage that is directly proportional to the supplied frequency, thus providing the operator an input of turbine shaft speed. The output of voltage converter integrated circuit 57 is split into two signals. One signal is directed to analog-to-digital integrated circuit 60 that measures the voltage and encodes it to illuminate the correct segments of digital RPM display 5 on control panel 100 to provide a visual indication of engine RPM. The other signal is directed to operational amplifier integrated circuit 58 on ECU 14, where it is electrically isolated and passed along to integrating amplifier integrated circuit 56.

Integrating amplifier integrated circuit 56 now compares the desired RPM signal discussed above with the scaled and isolated signal introduced by operational amplifier integrated circuit 58, and creates an output voltage in relation to the error between the requested RPM and the actual RPM. This output voltage increases over time if the actual RPM is below the requested RPM and decreases over time if the actual RPM is above the requested RPM. The rate of change is related to the amount of error as a continuously integrated function.

This control signal is now directed to automatic pulse forming integrated circuit 59, which interprets this command signal and generates positive going pulses at a preset frequency in proportion to the amount of signal supplied. These pulses are then directed to amplification system integrated circuit 55. Electric pulses amplified by amplification system integrated circuit 55 become fuel injector control signals 43 that are conveyed to engine injectors 20. These signals cause the injectors to open when the signal is present to deliver fuel to the engine and to close in its absence to halt fuel delivery. Thus, the width (or duration) if the electric pulse controls the amount of fuel admitted through each injector 20.

Engine speed sensor 45 will detect decreased engine speed (RPM) caused by increased loading on the engine and will send RPM sensor signal 46 to voltage converter integrating circuit 57 on ECU 14. The engine alternator and the ECU feedback system chain of voltage converter integrated circuit 57, operational amplifier integrated circuit 58, and integrating amplifier integrated circuit 56 modifies the input to automatic pulse forming integrated circuit 59 and to amplification system integrated circuit 55, sending fuel injector signals 43 to the injectors 20 thereby causing them to remain open for a longer time to inject more fuel to maintain the desired RPM. The same but opposite effect occurs upon decreasing load on the engine. Reaction time of the system is measured in milliseconds, and provides an almost instantaneous correction to load-induced RPM variations.

A second input to the control system in this embodiment is a constant monitoring of exhaust gas temperature to protect the structural integrity of the engine. A thermocouple may be inserted into the exhaust gas stream to act as exhaust gas temperature sensor 47. This sensor monitors exhaust gas temperature and generates a minute electrical voltage due to the Seebeck effect, which is proportional to gas temperature. This electrical temperature signal 48 is directed to thermocouple amplifier integrated circuit 61 located on ECU 14 (FIGS. 5 and 6), where it is amplified by a factor of 100. The electrical output of thermocouple amplifier integrated circuit 61 is directed to voltage comparator integrated circuit 62, where it is compared to a preset voltage chosen to reflect a maximum safe operating temperature of the turbine components. The output of comparator integrated circuit 62 is directed to the input of integrating amplifier integrated circuit 56 to meet the already present RPM demand signal previously discussed. When exhaust gas temperature rises to the preset safety level, thermocouple amplifier integrated circuit 61 and comparator integrated circuit 62 generate an output signal to cause an override to the incoming signal from automatic control dial 13, artificially forcing the RPM demand signal to a lower level and thereby causing a reduction in the signal to automatic pulse forming integrated circuit 59 and amplification system integrated circuit 55. This reduced fuel injector control signal 43 decreases the duration of fuel pulsing through injectors 20 by way of the feedback loop discussed above. The resultant decrease in delivered fuel slows the engine, reduces exhaust gas temperature, and protects the turbine components.

We claim:

1. An apparatus for delivering fuel in pulses directly into the combustion chamber of a turbine engine, said apparatus comprising:
    at least one fuel injector having means for atomizing fuel and delivering said atomized fuel in pulses directly into said combustion chamber of said turbine engine;
    at least one operating sensor, said sensor having means for receiving sensor signals from a selected operating function of said turbine engine;
    a programmable electronic control unit for receiving and comparing the value of said sensor signals from said turbine engine to the value of a desired signal, and for generating fuel injector control signals in response thereto; and
    a means for directing said fuel injector control signals to said fuel injector to modify the pulse duration and/or frequency of fuel injection in response to a deviation from desired engine speeds caused by variable operating loads encountered by the turbine engine.

2. The apparatus of claim 1 wherein said turbine engine comprises from 4 to 8 fuel injectors.

3. The apparatus of claim 1 wherein at said at least one operating sensor, said sensor signals from a selected operating function of said turbine engine are generated from the revolutions per minute of the turbine engine.

4. The apparatus of claim 1 wherein at said at least one operating sensor, said sensor signals from a selected operating function of said turbine engine are generated from the exhaust gas temperature of the turbine engine.

5. The apparatus of claim 1 wherein the revolutions per minute of said engine and the exhaust gas temperature of said engine comprise the operating sensors of said engine.

6. The apparatus of claim 1 wherein said selected operating function includes at least one of engine operating speed, engine power and engine fuel demand.

7. The apparatus of claim 1 wherein the programmable electronic control unit is selected from a group comprising at least one of solid state circuitry, a microprocessor and a microcomputer.

8. The apparatus of claim 1 wherein said programmable electronic control unit comprises integrated circuits that receive input signals from at least one selected operating function of said turbine engine and that generate fuel injector control signals in response thereto.

9. The apparatus of claim 1 wherein said programmable electronic control unit generates an output signal based on exhaust gas temperature to override an incoming engine speed demand signal to decrease the duration of fuel pulsing through said fuel injector.

10. The apparatus of claim 1 wherein said programmable electronic unit generates fuel injector signals that modify the ratio of pulse duration to frequency of said fuel injector in response to a deviation from desired operating speeds.

11. The apparatus of claim 1 wherein said desired operating speed may remain constant and may vary as said engine operates.

12. An apparatus for delivering fuel in pulses directly into the combustion chamber of a turbine engine, said apparatus comprising:
    at least one fuel injector having means for atomizing fuel and delivering said atomized fuel in pulses directly into said combustion chamber of said turbine engine;

a first operating sensor, said first sensor having means for receiving sensor signals generated from the revolutions per minute of said turbine engine, and a second operating sensor, said second sensor having means for receiving sensor signals generated from the exhaust gas temperature of said turbine engine;

a programmable electronic control unit comprising integrated circuits for receiving and comparing the value of sensor signals from said first sensor and said second sensor of said turbine engine to the value of a desired signal, and for generating fuel injector control signals in response thereto; and a means for directing said fuel injector control signals to said fuel injector to modify the pulse duration and/or frequency of fuel injection in response to a deviation from a selected operating function caused by variable operating loads encountered by the turbine engine.

13. The apparatus of claim 12 wherein said selected operating function may remain constant and may vary as said engine operates.

14. The apparatus of claim 12 wherein said programmable electronic control unit generates an output signal based on exhaust gas temperature to override an incoming engine speed demand signal to decrease the duration of fuel pulsing through said fuel injector.

15. A method for delivering fuel in pulses directly into the combustion chamber of a turbine engine and having at least one fuel injector and at least one sensor for sensing operating signals from said engine, said method comprising the steps of:

atomizing fuel and delivering said atomized fuel in pulses directly into said combustion chamber using said injector;

sensing at least one operating sensor signal from said turbine engine using said sensor;

directing sensor signals from said operating sensor to a programmable electronic control unit;

at said programmable electronic control unit, comparing the value of said sensor signal to the value of a desired signal and generating fuel injector control signals in response to said sensor signal; and directing said fuel injector signals to said fuel injector to modify the pulse duration and/or frequency of fuel injection in response to a deviation from desired engine speeds caused by variable operating loads encountered by the turbine engine.

16. The method of claim 15 wherein said operating sensor signals are generated from the revolutions per minute of the turbine engine.

17. The method of claim 15 wherein said operating sensor signals are generated from the exhaust gas temperature of the turbine engine.

18. The method of claim 15 wherein said step of generating fuel injector control signals at said programmable electronic control unit is accomplished using a pulse width modulation system comprising at least one of solid state circuitry, a microprocessor and a microcomputer.

19. The method of claim 15 including the additional steps of sensing increasing exhaust gas temperature with a temperature probe and over-riding other sensor signals to decrease the pulse width of the fuel injector in response to increasing exhaust gas temperature.

* * * * *